(12) United States Patent
Chang et al.

(10) Patent No.: US 10,377,112 B2
(45) Date of Patent: Aug. 13, 2019

(54) MEMBRANES AND USES THEROF

(71) Applicant: NIKE, Inc., Beaverton, OR (US)

(72) Inventors: Yihua Chang, Portland, OR (US); Richard L. Watkins, Portland, OR (US)

(73) Assignee: Nike, Inc., Beaverton, OR (US)

( * ) Notice: Subject to any disclaimer, the term of this patent is extended or adjusted under 35 U.S.C. 154(b) by 309 days.

(21) Appl. No.: 14/852,307

(22) Filed: Sep. 11, 2015

(65) Prior Publication Data

US 2016/0075113 A1 Mar. 17, 2016

Related U.S. Application Data

(60) Provisional application No. 62/049,814, filed on Sep. 12, 2014.

(51) Int. Cl.
*B32B 27/08* (2006.01)
*B29C 47/06* (2006.01)
(Continued)

(52) U.S. Cl.
CPC ............ *B32B 27/08* (2013.01); *A43B 13/023* (2013.01); *A43B 13/20* (2013.01); *A43B 13/206* (2013.01);
(Continued)

(58) Field of Classification Search
CPC ... A43B 13/206; B29C 47/0064; B29C 47/06; B29C 48/18; B29C 48/0021; B29K 2023/086; B29K 2075/00; B29K 2995/0065; B29L 2009/00; B29L 2031/504; B32B 2250/05; B32B 2250/24; B32B 2250/42; B32B 2274/00; B32B 2307/54; B32B 2307/552; B32B 2307/558;
(Continued)

(56) References Cited

U.S. PATENT DOCUMENTS

2005/0031816 A1* 2/2005 Chang ................. A43B 13/026
428/35.7
2007/0141282 A1 6/2007 Chang et al.
(Continued)

FOREIGN PATENT DOCUMENTS

WO WO-2005017024 A2 2/2005
WO WO-2005023036 A2 3/2005
(Continued)

OTHER PUBLICATIONS

Cray Valley Application Bulletin, entitled "Novel Polybutadiene Diols for Thermoplastic Polyurethanes", 2010.*
(Continued)

*Primary Examiner* — Yan Lan
(74) *Attorney, Agent, or Firm* — Thomas|Horstemeyer, LLP

(57) ABSTRACT

Membranes and methods for producing them are disclosed. The membranes comprise a core layer comprising a composite of alternating thermoplastic polyurethane (TPU) and barrier microlayers, and they comprise at least one cap layer that is bonded to the core layer or a structural layer. In some embodiments, at least the cap layer comprises a polydiene polyol-based TPU. The membrane may further comprise a rubber layer bonded to the cap layer.

21 Claims, 6 Drawing Sheets

(51) Int. Cl.

| | | |
|---|---|---|
| *B29C 47/00* | (2006.01) | |
| *B32B 27/40* | (2006.01) | |
| *B32B 27/30* | (2006.01) | |
| *B29C 48/18* | (2019.01) | |
| *B29C 48/00* | (2019.01) | |
| *A43B 13/20* | (2006.01) | |
| *B32B 7/10* | (2006.01) | |
| *B32B 7/12* | (2006.01) | |
| *B32B 25/16* | (2006.01) | |
| *A43B 13/02* | (2006.01) | |
| *B29K 23/00* | (2006.01) | |
| *B29K 75/00* | (2006.01) | |
| *B29L 9/00* | (2006.01) | |
| *B29L 31/50* | (2006.01) | |

(52) U.S. Cl.
CPC .......... *B29C 48/0021* (2019.02); *B29C 48/18* (2019.02); *B32B 7/10* (2013.01); *B32B 7/12* (2013.01); *B32B 25/16* (2013.01); *B32B 27/306* (2013.01); *B32B 27/40* (2013.01); B29K 2023/086 (2013.01); B29K 2075/00 (2013.01); B29K 2995/0065 (2013.01); B29L 2009/00 (2013.01); B29L 2031/504 (2013.01); B32B 2250/05 (2013.01); B32B 2250/24 (2013.01); B32B 2250/42 (2013.01); B32B 2274/00 (2013.01); B32B 2307/54 (2013.01); B32B 2307/552 (2013.01); B32B 2307/558 (2013.01); B32B 2307/716 (2013.01); B32B 2307/7242 (2013.01); B32B 2307/7246 (2013.01); B32B 2437/02 (2013.01); B32B 2479/00 (2013.01); B32B 2535/00 (2013.01)

(58) Field of Classification Search
CPC ...... B32B 2307/716; B32B 2307/7242; B32B 2307/7246; B32B 2437/02; B32B 2479/00; B32B 2535/00; B32B 25/16
See application file for complete search history.

(56) References Cited

U.S. PATENT DOCUMENTS

| | | |
|---|---|---|
| 2012/0237742 A1 | 9/2012 | Tai et al. |
| 2013/0186539 A1 | 7/2013 | Takahashi et al. |
| 2014/0007647 A1 | 1/2014 | Mannal et al. |
| 2014/0039080 A1 | 2/2014 | Amamoto et al. |
| 2014/0076474 A1 | 3/2014 | Amamoto et al. |
| 2014/0096882 A1 | 4/2014 | Kitano et al. |
| 2014/0099490 A1 | 4/2014 | Kitano et al. |
| 2014/0124114 A1 | 5/2014 | Hayashi et al. |
| 2014/0316023 A1 | 10/2014 | Amamoto et al. |
| 2014/0326376 A1 | 11/2014 | Amamoto et al. |
| 2015/0125685 A1 | 5/2015 | Kitano et al. |

FOREIGN PATENT DOCUMENTS

| | | |
|---|---|---|
| WO | WO-2016040893 A1 | 3/2005 |
| WO | 2009017868 | 2/2009 |

OTHER PUBLICATIONS

"International Application Serial No. PCT/US2015/049827, International Search Report dated Dec. 3, 2015", 6 pgs.

"International Application Serial No. PCT/US2015/049827, Written Opinion dated Dec. 3, 2015", 5 pgs.

Adhikari, Rameshwar, "Correlations Between Molecular Architecture, Morphology and Deformation Behaviour of Styrene/Butadiene Block Copolymers and Blends", (Nov. 30, 2011), 162 pgs.

Miller-Chou, Beth A., et al., "A review of polymer dissolution", Prog. Polym. Sci. 28, (2003), 1223-1270.

Ovejero, G., et al., "Solubility and Flory Huggins parameters of SBES, poly(styrene-b-butene/ethylene-b-styrene) triblock copolymer, determined by intrinsic viscosity", European Polymer Journal 43, (2007), 1444-1449.

Written Opinion for PCT/US2017/039087 dated Sep. 29, 2017.

* cited by examiner

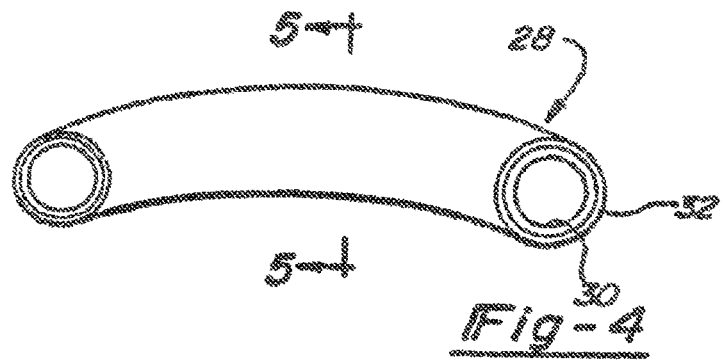
FIG-4
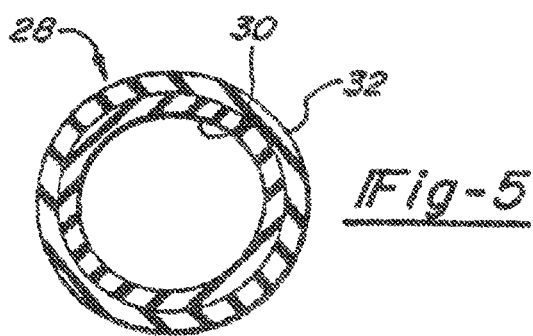
FIG-5
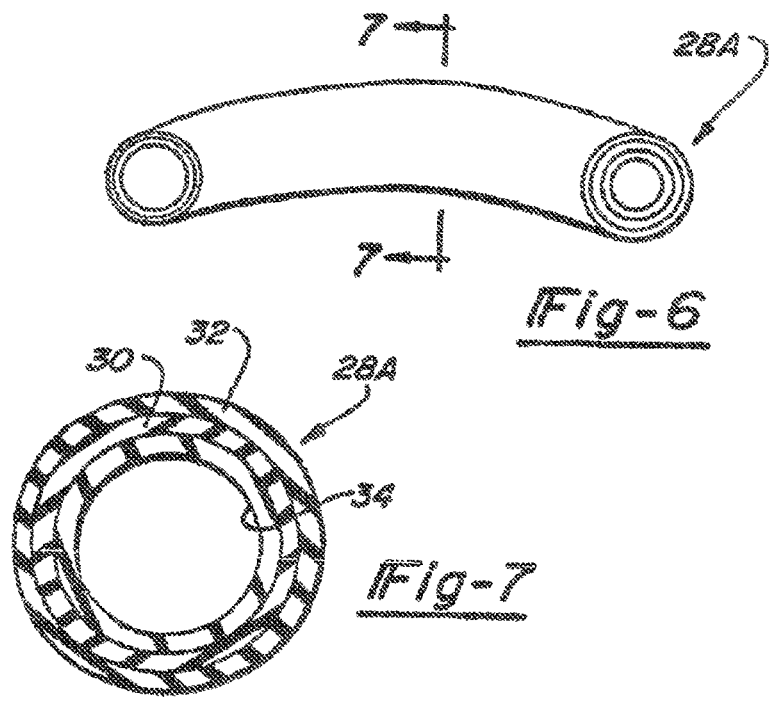
FIG-6
FIG-7

MEMBRANES AND USES THEROF

CROSS-REFERENCE TO RELATED APPLICATIONS

This application claims priority to U.S. Provisional Appl. Ser. No. 62/049,814, filed Sep. 12, 2015, the entirety of which is incorporated by reference as if fully set forth herein.

FIELD

The disclosure relates to membranes, including membranes used in gas-filled bladders and cushioning devices.

BACKGROUND

Membranes having good flexibility and resilience as well as excellent fluid (gas or liquid) barrier properties are needed for constructing gas-filled bladders, cushioning devices, and similar structures. The membranes need to have low gas transmission rates for nitrogen or other gases that are used to inflate the bladder or cushioning device. Thermoset and thermoplastic polymers are used in these applications because of their excellent flexibility. Thermoplastic polymers, particularly thermoplastic polyurethanes ("TPUs"), are desirable because their scraps can be reclaimed, melted, and reused to produce new thermoplastic articles. Although thermoset materials lack the recyclability advantage, they can be needed to achieve a well-balanced set of physical and mechanical properties for such demanding applications as footwear, sporting equipment, and automobile tires.

BRIEF DESCRIPTION OF THE DRAWINGS

FIGS. 1-20 illustrate various aspects of the present disclosure.

FIG. 1 is a side elevational view of an athletic shoe with a portion of the midsole cut-a-way to expose a cross-sectional view.

FIG. 2 is a bottom elevational view of the athletic shoe of FIG. 1 with a portion cut-a-way to expose another cross-sectional view.

FIG. 3 is a section view taken along line 3-3 of FIG. 1.

FIG. 4 is a fragmentary side perspective view of one embodiment of a tubular-shaped, two-layer cushioning device.

FIG. 5 is a sectional view taken along line 5-5 of FIG. 4.

FIG. 6 is a fragmentary side perspective view of a second embodiment of a tubular-shaped, three-layer cushioning device.

FIG. 7 is a sectional side view taken along line 7-7 of FIG. 6.

FIG. 8 is a perspective view of an alternative cushioning device embodiment.

FIG. 9 is a side view of the membrane illustrated in FIG. 8.

FIG. 10 is a perspective view of an alternative cushioning device embodiment.

FIG. 11 is a side elevational view of an athletic shoe having an alternative cushioning device embodiment.

FIG. 12 is a perspective view of the cushioning device illustrated in FIG. 11.

FIG. 13 is a top elevation view of the cushioning device illustrated in FIGS. 11 and 12.

FIG. 14 is a side elevation view of an athletic shoe having another alternative cushioning device embodiment.

FIG. 15 is a perspective view of the cushioning device illustrated in FIG. 14.

FIG. 16 is a top view of the cushioning device illustrated in FIGS. 14 and 15.

FIG. 17 is a perspective view of an alternative cushioning device embodiment.

FIG. 18 is a side view of the cushioning device illustrated in FIG. 17.

FIG. 19 shows a membrane comprising TPU cap layers, TPU structural layers, and a core layer comprising alternating TPU and barrier microlayers.

FIG. 20 shows an expanded view of a section of the membrane of FIG. 19.

DESCRIPTION

Figure 1:
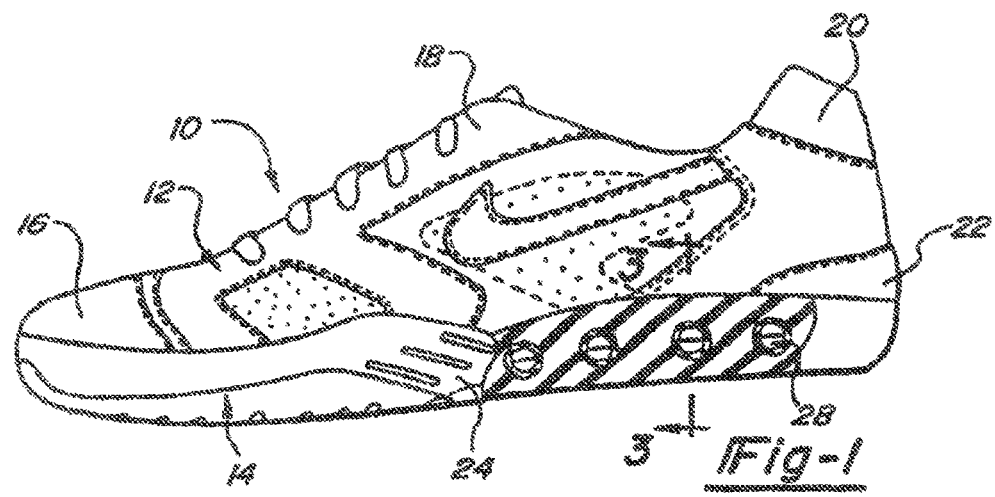
Figure 2:
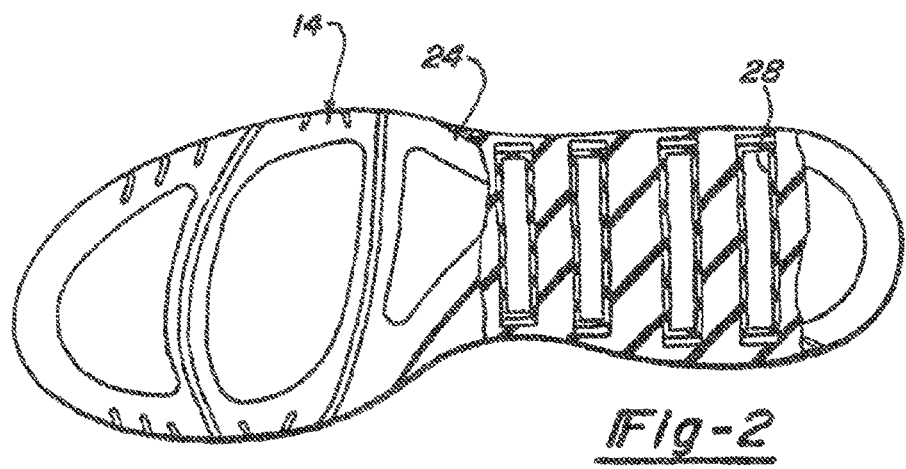
Figure 3:
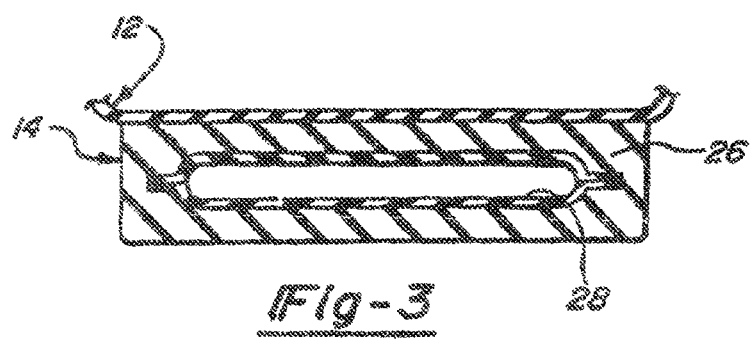

In one aspect, the disclosure relates to a membrane. The membrane comprises at least one cap layer that is bonded to a core layer or a structural layer. In some embodiments, the cap layer is reactive, such that it can bond (e.g., covalently) to another layer (e.g., a rubber layer, wherein the rubber can be natural rubber, butyl rubber, neoprene rubber, nitrile rubber, isoprene rubber, butadiene rubber, styrene-butadiene rubber, ethylene-propylene-diene (EPDM) rubber, ethylene-propylene rubber, urethane rubber, and any combination thereof) that is placed adjacent and directly in contact with the cap layer.

As used herein, the term "reactive" generally refers to a cap layer having, among other properties, hot-melt properties, such that when it is heated, the cap layer melts, at least partially, and bonds to another layer that is placed adjacent and directly in contact with the cap layer. In some embodiments, the cap layer melts at least at the interface between the cap layer and the other layer that is placed adjacent and directly in contact with the cap layer.

The term "reactive" also encompasses a cap layer comprising a "cure package," where the cure package comprises agents (e.g., molecular sulfur and peroxide curing agents such as dicumyl peroxide, zinc peroxide, benzoyl peroxide, 2,4-chlorobenzoyl peroxide, 2,5-bis(t-butylperoxy)-2,5-dimethylhexane, and the like) that are dissolved, suspended or otherwise dispersed in the cap layer. The agents can be dissolved, suspended or otherwise dispersed throughout the entire cap layer or in a portion of the cap layer (e.g., substantially on the surface of the cap layer; substantially near the surface of the cap layer; or only in the area of the cap layer that is adjacent and directly in contact with the other layer that is placed adjacent and directly in contact with the cap layer). When the agents are activated (e.g., by using heat or any other suitable form of radiation that effects activation of the agents), they effect chemical reactions that, in some embodiments, cause the cap layer to "cure to" (e.g., form covalent bonds with) the layer that is placed adjacent and directly in contact with the cap layer, thereby bonding the cap layer to another layer that is placed adjacent and directly in contact with the cap layer. The "chemical reactions" include, but are not limited to, crosslinking reactions (e.g., vulcanization) between the surfaces of the bulk material that makes up the cap layer and the surface of a layer that is placed adjacent and directly in contact with the cap layer.

In still other embodiments, the term "reactive" encompasses a cap layer comprising a suitable solvent (e.g., benzene; ($C_1$-$C_6$)alkyl benzenes, such as o-xylene, m-xylene, p-xylene, toluene, ethyl benzene, propyl benzene, cumene, 1,3,5-trimethylbenzene; ketones, such as phenyl acetone; and ethers, such as benzyl phenyl ether; esters, such as benzyl acetate and benzyl propionate) that causes at least a portion of the cap layer (e.g., substantially only the surface of the cap layer; or only the area of the cap layer that is adjacent and directly in contact with the other layer that is placed adjacent and directly in contact with the cap layer) to dissolve/diffuse into a layer that is placed adjacent and directly in contact with the cap layer. The dissolution/diffusion can occur substantially at the interface between the cap layer and a layer that is placed adjacent and directly in contact with the cap layer. In some embodiments, if the boiling point of the solvent is sufficiently high (e.g., from about 200° C. to about 300° C.), the solvent can be compounded into the cap layer.

In still other embodiments, the term "reactive" encompasses a cap layer that is a "B-staged" film or layer that is uncured and has reactive groups remaining that would allow it to bond to a layer that is placed adjacent and directly in contact with the cap layer when the cap layer is subsequently cured.

As used herein, the term "B-staged" (and its variants, including "B-staging") is used to refer to the processing of a material by any suitable means (e.g., heat or irradiation) so that the material is partially cured. This is different from the "A-stage," where the material is uncured, and the "C-stage," where the material is fully cured.

In yet other embodiments, an adhesive (e.g., a polyisocyanate-based adhesive available from Loctite, Westlake, Ohio; urethane adhesive; epoxy adhesive; cyanoacrylate glue; and the like) can be applied to at least one surface of the cap layer that comes in contact with a layer that is placed adjacent and directly in contact with the cap layer, thereby bonding the cap layer to a layer that is placed adjacent and directly in contact with the cap layer. In some embodiments, the adhesive is applied to the cap layer and the layer that is placed adjacent and directly in contact with the cap layer.

In still other embodiments, the term "reactive" also encompasses a cap layer, wherein at least the surface of the cap layer that is in contact with a layer that is placed adjacent and directly in contact with the cap layer is capable of dissolving/diffusing into a layer that is placed adjacent and directly in contact with the cap layer, in the absence of a solvent or a tie layer, as the term "tie layer" is defined herein.

The extent to which the cap layer and the layer that is placed adjacent and directly in contact with the cap layer dissolve/diffuse into each other depends on each of the layers' compatibility. The layers' compatibility can depend, in some embodiments, on the solubility parameters of the cap layer and the layer that is placed adjacent and directly in contact with the cap layer. Briefly, solubility parameters are often used in industry to predict compatibility of polymers, chemical resistance, swelling of cured elastomers by solvents, permeation rates of solvents, and even to characterize the surfaces of pigments, fibers, and fillers. See, e.g., Miller-Chou, B. A. and Koenig, J. L., *Prog. Polym. Sci.* 28: 1223-1270 (2003) and Rameshwar Adhikari, Correlations Between Molecular Architecture, Morphology and Deformation Behaviour of Styrene/Butadiene Block Copolymers and Blends (Nov. 30, 2001) (unpublished Ph.D. dissertation, Martin Luther University Halle-Wittenberg), which are incorporated by reference as if fully set forth herein.

If two polymers are mixed, the most frequent result is a system that exhibits a complete phase separation due to the repulsive interaction between the components (i.e., the chemical incompatibility between the polymers). Complete miscibility in a mixture of two polymers requires that the following conditions be fulfilled.

$$\Delta G_m = \Delta H_m - T\Delta S_m < 0$$

where $\Delta G_m$, $T\Delta S_m$, and $TLS_m$ represent the Gibb's free energy, enthalpy, and entropy of mixing at temperature T, respectively. The lattice theory for the enthalpy of mixing in polymer solutions, developed by Flory and Huggins, can be formally applied to polymer mixtures, which provides an estimation of the miscibility of the polymers. The entropy and enthalpy of mixing of two polymers are given by the equations:

$$T\Delta S_m = -k[n_1 ln\phi_1 + n_2 ln\phi_2]$$

$$\Delta H_m = kTX_{12}N\phi_1\phi_2$$

where $\phi_i$ is the volume fraction of the polymer i and $N=n_1+n_2$ is the total number of polymer molecules in the mixture. The term X (xi) is called Flory-Huggins interaction parameter and can be further defined by the equation:

$$X_{12} = [V_{ref}(\delta_1-\delta_2)^2]/RT$$

wherein $V_{ref}$ is an appropriately chosen "reference volume," sometimes taken as 100 cm$^3$/mol; $\delta_1$ and $\delta_2$ are the solubility parameters of polymers 1 and 2; R is the gas constant (e.g., 8.3144621 Joules/mole·Kelvin); and T is the temperature (e.g., in Kelvin). The solubility parameters for any given polymer can be determined empirically. See, e.g., G. Ovejero et al., *European Polymer Journal* 43: 1444-1449 (2007), which is incorporated by reference as if fully set forth herein.

Hence, enthalpic and entropic contribution to free energy of mixing can be parameterized in terms of Flory-Huggins segmental interaction parameter X and the degree of polymerisation N, respectively. Since the entropic and enthalpic contribution to free energy density scale respectively as $N^{-1}$ and X, it is the product XN that dictates the block copolymer phase state, and it is called the reduced interaction parameter or lumped interaction parameter. In some embodiments, when the value of this parameter is less than or equal to about 10 (e.g., less than about 8, less than about 6, less than about 4, less than about 2, less than about 1; less than about 0.1; less than about 0.05; from about 0.01 to about 1; from about 0.01 to about 0.05; from about 0.5 to about 10, from about 1 to about 3, from about 2 to about 9, from about 3 to about 8 or about 5 to about 10), the compatibility between the cap layer and the layer that is placed adjacent and directly in contact with the cap layer is sufficient for adhesion between the cap layer and the layer that is placed adjacent and directly in contact with the cap layer.

In yet other embodiments, the cap layer need not be initially reactive, but can be transformed into a reactive cap layer. In some embodiments, an "unreactive" cap layer can be transformed into a reactive cap layer by treating the unreactive cap layer with any suitable agent, including radiation (e.g., electron beam and gamma rays), plasma treatment, a chemical agent (e.g., ozone) or a combinations of one or more of these.

In some embodiments, the cap layer is a TPU cap layer. In some embodiments, the TPU cap layer comprise a polydiene polyol-, polyether polyol-, polyester polyol-, polycaprolactone-, polysiloxanes polyol-based TPU. In some aspects, the membrane may further comprises a rubber layer bonded to at least one TPU cap layer, since the cap layer can be comprised of multiple layers that, collectively, form the cap layer. The polydiene polyol-based TPU can be made from a polybutadiene polyol, a polyisoprene polyol, or a partially or fully hydrogenated derivative of a polybutadiene polyol or of a polyisoprene polyol, or any combination thereof.

In some embodiments, the membrane comprises a core layer comprising a composite of alternating thermoplastic polyurethane (TPU) and barrier microlayers. Optionally, the membrane comprises at least one TPU structural layer bonded to the core layer. Optionally, the membrane comprises at least one tie layer between the core layer and the cap layer, or between the core layer and the optional structural layer when present, or between the optional structural layer when present and the cap layer, or any combination thereof. The at least one TPU cap layer, and optionally the core layer, the optional structural layer when present, or both the core layer and the optional structural layer when present, comprise a polydiene polyol-based TPU. In some aspects, the membrane may further comprise a rubber layer bonded to the at least one TPU cap layer. The polydiene polyol-based TPU can be made from a polybutadiene polyol, a polyisoprene polyol, or a partially or fully hydrogenated derivative of a polybutadiene polyol or of a polyisoprene polyol, or any combination thereof.

In another aspect, the disclosure relates to a method for producing a membrane. The method comprises co-extruding alternating barrier and TPU microlayers to form a core layer comprising a composite of the microlayers. Optionally, at least one TPU structural layer is applied to the core layer to give a combination core-and-structural layer. At least one TPU cap layer is co-extruded with either the core layer or the combination core-and-structural layer to form the membrane. Alternatively, at least one cap layer is laminated onto either the core layer or the combination core-and-structural layer to form the membrane. The at least one cap layer comprises a polydiene polyol-based TPU.

Membranes of the disclosure are valuable for constructing, among other things, inflated structures such as gas-filled bladders or cushioning devices (e.g., for automobiles and trucks, such as pneumatic shock absorbers) having good moisture resistance and very low gas transmission rates. The disclosure includes articles of manufacture that utilize the membranes and inflated structures, such as shoes, skates, balls, tires, bicycle seats, saddles, personal protective articles, flexible and rigid flotation devices, medical, prosthetic, and orthopedic devices, accumulators, and articles of furniture. The polydiene polyol-based TPUs enable the production of membranes having superior adhesion to rubber, polyolefins, and other non-polar substrates, such as polyacrylonitrile and EPDM.

I. Membranes

Membranes of the disclosure comprise a core layer comprising a composite of alternating TPU and barrier microlayers. In some embodiments, the membranes of the various embodiments of the present invention are durable membranes. By "durable," it is meant that the membrane has at least excellent resistance to fatigue failure. A membrane resists fatigue failure when, for example, it can undergo repeated flexing and/or deformation and substantially recover without delamination along the layer interfaces or without creating a crack that runs through the thickness of the membrane, preferably over a broad range of temperatures.

As used herein, "membrane" generally refers to a free-standing film separating one fluid (whether liquid or gas) from another fluid. Films laminated or painted onto another article for purposes other than separating fluids are excluded from this definition of membrane. A membrane is normally a multilayer, composite structure made up of many polymeric microlayers.

A. The Core Layer

"Core layer" refers to an inner layer or layers, often the innermost layer or layers, in a multilayer structure. These are usually the layers closest to the fluid contained in a bladder or cushioning device. The core layer comprises a composite of alternating TPU and barrier microlayers. By "microlayer," it is meant an individual layer of TPU or barrier material having a thickness in the range of a few nanometers to several mils (about 100 microns). In some aspects, the individual microlayers will have an average thickness up to about 0.1 mil (about 2.5 microns). The individual microlayers can have average thicknesses of about 0.0004 mil (about 0.01 micron) to about 0.1 mil (about 2.5 microns). Individual barrier material layers of about 0.05 mils (about 1.2 microns) may be desirable, as thin barrier layers can help to provide ductile membranes.

The core layer may comprise many alternating microlayers. The core layer may be a polymeric composite having at least about 10 layers, or at least about 20 layers, or at least about 50 layers. The core layer can have thousands of microlayers, and the skilled artisan will appreciate that the number of microlayers will depend upon such factors as the particular materials chosen, thicknesses of each layer, the thickness of the core layer, the processing conditions, and the intended use of the core layer. In one aspect, the core layer will comprise from about 10 to about 1000 microlayers, or from about 30 to about 1000 microlayers, or from about 50 to about 500 layers.

Optionally, the membrane comprises at least one TPU structural layer bonded to the core layer.

In some embodiments, the membrane comprises at least one TPU cap layer bonded to the core layer or to the optional structural layer when present.

Optionally, the membrane comprises at least one tie layer between the core layer and the cap layer, or between the core layer and the optional structural layer when present, or between the optional structural layer when present and the cap layer, or any combination thereof.

The TPU microlayers of the core layer and the TPUs of the at least one cap layer and the optional structural layer are formed from elastomeric thermoplastic polyurethanes. In membranes of the disclosure, the at least one TPU cap layer, and optionally the core layer, the optional structural layer when present, or both the core layer and the optional structural layer when present, comprise a polydiene polyol-based TPU. In one aspect, the core layer comprises microlayers made from a polydiene polyol-based TPU.

Suitable polydiene polyol-based TPUs are made by reacting a polydiene polyol, a polyisocyanate, and, in some embodiments, a chain extender. In some cases, the polydiene polyol-based TPU may be available commercially. However, the TPUs can be made and customized for a particular purpose. The TPUs can be made using a prepolymer approach in which the polyisocyanate and polydiene polyol are pre-reacted to form an NCO-terminated intermediate, followed by a subsequent reaction with a chain extender to generate the high polymer. A "one shot" technique, in which the polydiene polyol, polyisocyanate, and chain extender are reacted in one step, can also be used. The "one shot" and prepolymer techniques are well known in the polyurethane art.

The polydiene polyol-based TPUs can be linear and thus the polyisocyanate component can be substantially di-functional. Suitable diisocyanates used to prepare the TPUs can be well known aromatic, aliphatic, and cycloaliphatic diisocyanates. Examples include diphenylmethane diisocyanate (MDI), polymeric MDIs (PMDI), isophorone diisocyanate (IPDI), hydrogenated MDIs (e.g., H12MDI), cyclohexyl diisocyanate (CHDI), tetramethylxylylene diisocyanates (TMXDI), 1,6-hexamethylene diisocyanate (HDI), 1,4-butylene diisocyanate, lysine diisocyanate, toluene diisocyanates, xylylenediisocyanates (XDI), hydrogenated XDIs (e.g., H6XDI), p-phenylene diisocyanate, napththalene diisocyanates (NDI), 4-chloro-1,3-phenylene diisocyanate, 1,5-tetrahydronaphthalene diisocyanate, 4,4'-dibenzyl diisocyanate, and the like, and combinations thereof. MDI and polymeric MDIs can be used.

Suitable chain extenders for use in making the polydiene polyol-based TPUs are also well known. In general, the chain extenders will have at least two, or exactly two, active hydrogen groups. Examples include low-molecular-weight diols, dithiols, diamines, or compounds having a mixture of hydroxyl, thiol, and amine groups, such as alkanolamines, aminoalkyl mercaptans, and hydroxyalkyl mercaptans, among others. The molecular weight of the chain extender can range from about 60 to about 400. Alcohols and amines can be used. Suitable diol chain extenders include, for example, 1,6-hexanediol, 1,4-cyclohexanedimethanol, 2-ethyl-1,6-hexanediol, 1,4-butanediol, ethylene glycol, lower oligomers of ethylene glycol (e.g., diethylene glycol, triethylene glycol, and tetraethylene glycol), propylene glycol, lower oligomers of propylene glycol (e.g., dipropylene glycol, tripropylene glycol, and tetrapropylene glycol), 1,3-propanediol, 2-methyl-1,3-propanediol, neopentyl glycol, dihydroxyalkylated aromatic compounds (e.g., bis(2-hydroxyethyl) ethers of hydroquinone and resorcinol, xylene-α,α-diols and their bis(2-hydroxyethyl) ethers), and mixtures thereof. Suitable diamine chain extenders include, for example, p-phenylenediamine, m-phenylenediamine, benzidine, 4,4'-methylenedianiline, 4,4'-methylenebis(2-chloroaniline), ethylene diamine, and combinations of these. Other typical chain extenders are amino alcohols such as ethanolamine, propanolamine, butanolamine, and combinations of these. Examples of chain extenders include ethylene glycol, diethylene glycol, triethylene glycol, tetraethylene glycol, propylene glycol, dipropylene glycol, tripropylene glycol, tetrapropylene glycol, 1,3-propylene glycol, 1,4-butanediol, 1,6-hexanediol, and combinations of these. A minor proportion of mono- or trifunctional material (e.g., glycerin or trimethylolpropane) may be present along with the difunctional chain extender to adjust reactivity or modify properties of the polydiene polyol-based TPU.

Polydiene polyols suitable for use in making the TPUs are well known, and many are available commercially. The polydiene polyols can have an average hydroxyl functionality within the range of 1.7 to 2.5. Polydiene diols having an average hydroxyl functionality within the range of 1.8 to 2.1 can be used. Polydiene diols having an average hydroxyl functionality within the range of from 1.9 to 2.0 can be used.

Suitable polydiene polyols are hydroxyl-terminated polydienes. Examples include polybutadiene polyols, polyisoprene polyols, and the like. The polyols can be partially or fully hydrogenated. Polybutadiene polyols, including polybutadiene diols, can be used. Suitable polydiene polyols are available commercially from Cray Valley Hydrocarbon Specialty Chemicals, a brand of Total, under the Krasol® and Poly bd® trademarks. Examples include Krasol® LBH 2000 and Krasol® LBH 3000, which have secondary hydroxyl groups, and Krasol® LBH-P 2000 and Krasol® LBH-P 3000, which have primary hydroxyl groups. Hydrogenated products include Krasol® HLBH-P 2000 and Krasol® HLBH-P 3000. Other suitable commercial products include Poly bd® R-45HTLO, Poly b®d R-45V, Poly bd® R-20LM, and Poly bd® R-45M.

In some aspects, the polydiene polyol is unsaturated or at least partially unsaturated. The polydiene polyols can have an iodine value within the range of 50 to 500 g/100 g, or from 200 to 450 g/100 g.

In other aspects, the polydiene polyol has a hydroxyl number within the range of 11 to 560 mg KOH/g. The polydiene polyol can have a hydroxyl number within the range of from 28 to 250 mg KOH/g. The polydiene polyol can have a hydroxyl number within the range of from 28 to 112 mg KOH/g.

In some aspects, the polydiene polyol-based TPU is made from a polybutadiene polyol, a polyisoprene polyol, or a partially or fully hydrogenated derivative of a polybutadiene polyol or a polyisoprene polyol.

Other TPUs can be used for the core layer or any structural layer provided that a polydiene polyol-based TPU is used in at least one TPU cap layer. Thus, in some aspects, TPU microlayers of the core layer can be made using conventional polyether polyols, polyester polyols, polycarbonate polyols, polycaprolactone polyethers, or any combination thereof. Polyether diols, polyester diols, and polycarbonate diols can be used. TPUs based on polyester diols can be used, and may adhere particularly well to barrier layers in some examples. Suitable conventional polyols are well known and include polytetrahydrofurans, polycaprolactones, polyethers from propylene oxide, ethylene oxide, or their combinations, polyethylene adipate, polybutylene succinate, and the like. For examples of suitable conventional polyether, polyester, and polycarbonate polyols, see U.S. Pat. No. 6,582,786, the teachings of which are incorporated herein by reference.

In some embodiments, the core layer also comprises barrier microlayers. Suitable materials for these barrier microlayers include, for example, ethylene-vinyl alcohol copolymers (EVOH), poly(vinyl chloride), polyvinylidene polymers and copolymers (e.g., polyvinylidene chloride), polyamides (e.g., amorphous polyamides), acrylonitrile polymers (e.g., acrylonitrile-methyl acrylate copolymers), polyurethane engineering plastics, polymethylpentene resins, ethylene-carbon monoxide copolymers, liquid crystal polymers, polyethylene terephthalate, polyether imides, polyacrylic imides, and other polymeric materials known to have relatively low gas transmission rates. Blends and alloys of these materials, including combinations of polyimides and crystalline polymers, are also suitable. For instance, blends of polyimides and liquid crystal polymers, blends of polyamides and polyethylene terephthalate, and blends of polyamides with styrenics are suitable. In one aspect, the core layer comprises barrier microlayers of an ethylene-vinyl alcohol (EVOH) copolymer. The EVOH copolymer can be a copolymer in which the ethylene content of the copolymer is from about 25 mole percent to about 50 mole percent, or from about 25 mole percent to about 40 mole percent. Ethylene-vinyl alcohol copolymers can be prepared by fully hydrolyzing ethylene-vinyl acetate copolymers. The core layer may include different barrier materials as blends or as discrete layers.

Specific examples of suitable barrier layer materials include acrylonitrile copolymers such as Barex® resins, available from Ineos; polyurethane engineering plastics such as Isoplast® ETPU available from Lubrizol; ethylene-vinyl alcohol copolymers marketed under the trademarks EvaI™ by Kuraray, Soarnol™ by Nippon Gohsei, and Selar® OH by DuPont; polyvinylidiene chloride available from Dow Chemical under the tradename Saran™, and from Solvay under the tradename Ixan®; liquid crystal polymers such as Vectra® from Celanese and Xydar® from Solvay; MDX6 nylon, and amorphous nylons such as Novamid® X21 from DSM, Selar® PA from DuPont; polyetherimides sold under the tradename Ultem® by SABIC; poly(vinyl alcohol)s; and polymethylpentene resins available from Mitsui Chemicals under the TPX® mark. Commercially available copolymers of ethylene and vinyl alcohol, such as those available from Kuraray, can have an average ethylene content of between about 25 mol % to about 48 mol %.

B. The Cap, Structural, and Rubber Layers

As noted above, the membrane optionally comprises at least one TPU structural layer bonded to the core layer. Such structural layers need not comprise microlayers. The structural layer may comprise, but need not comprise, a polydiene polyol-based TPU. In some aspects, the optional at least one structural layer, when present, comprises a TPU made from a polyester polyol, a polyether polyol, a polycarbonate polyol, a polycaprolactone polyether, or any combination thereof. In some aspects, the optional at least one structural layer, when present, comprises a TPU made from a polydiene polyol-based TPU.

The membrane will comprise, in addition to the core layer and any structural layers, at least one TPU cap layer that is bonded to the structural layer or the core layer. The cap layer comprises a polydiene polyol-based TPU. In some aspects, the membrane comprises two TPU cap layers, at least one of which comprises a polydiene polyol-based TPU. The cap layer is frequently the outermost TPU layer for the membranes, gas-filled bladders, cushioning devices, or other structures described herein. The cap layer is commonly in direct contact with rubber or another non-polar substrate. In some aspects, an unsaturated polydiene polyol, for example an unsaturated polybutadiene diol, an unsaturated polyisoprene diol, or a combination of both, is used to make the polydiene polyol-based TPU for the cap layer.

The TPU cap layer adheres well to natural rubber, synthetic rubber, or other non-polar substrates, such as polyethylene, polypropylene, polystyrene, and poly(ethylene-co-vinyl alcohol. In some aspects, the cap layer comprises a TPU based on an unsaturated polydiene polyol. Good adhesion of the TPU to rubber or other non-polar substrates is a particular advantage for applications such as footwear or tire construction, for which dissimilar flexible materials are often bonded, in some cases securely and substantially irreversibly.

In some aspects, the membrane comprises a rubber layer bonded to the TPU cap layer or layers. Suitable materials for the rubber layer are natural and synthetic rubber. Examples include natural rubber, butyl rubber, neoprene rubber, nitrile rubber, isoprene rubber, butadiene rubber, styrene-butadiene rubber, ethylene-propylene-diene (EPDM) rubber, ethylene-propylene rubber, urethane rubber, and any combination thereof.

In some aspects, the rubber layer consists essentially of a silicone-free rubber.

In some aspects, the rubber layer is a sulfur-cured or peroxide-cured rubber layer. In one example, the rubber layer can be a sulfur-cured rubber. In another example, the rubber layer can be a peroxide-cured rubber.

In some aspects, the rubber layer comprises an acrylate rubber. In particular aspects, the acrylate rubber layer is bonded to the at least one TPU cap layer using a peroxide curing agent.

In one aspect, the TPU cap layer or layers are made from a polybutadiene polyol, a polyisoprene polyol, or a combination of both, and the rubber layer is bonded to the TPU cap layer(s) using a curing agent, for example a sulfur-based curing agent or a peroxide curing agent, or a sulfur-based curing agent. Suitable sulfur-based curing agents and peroxide curing agents are well known in the art.

In some aspects, a tie layer or an adhesive may be used to bond two or more layers of the membrane. For example, a tie layer or adhesive could be used between the core layer and the cap layer, or between the core layer and the optional structural layer when present, or between the optional structural layer when present and the cap layer, or any combination thereof. The choice of tie layer or adhesive will depend on the materials used for the layers to be bonded. When the layers to be joined are TPUs, other urethanes, polyacrylates, ethylene-acrylate copolymers, maleic anhydride grafted polyolefins, or the like might be utilized as the tie layer. Alternatively, in some aspects, the membrane may be free of a tie layer or adhesive. The presence of a tie layer or adhesive may prevent regrinding and recycling of any waste material generated during production of the membranes, bladders, cushioning devices, or end-use products that incorporate them.

In one aspect, the optional at least one structural layer, when present, comprises reground membrane material. The reground material can be, for example, reground core layer material, reground structural layer material, reground cap layer material, or any combination thereof.

In some aspects, the core layer comprises alternating polyester polyol-based TPU and ethylene-vinyl alcohol copolymer microlayers, and the optional at least one structural layer, when present, comprises a polydiene polyol-based TPU. The polydiene polyol-based TPU of the structural layer can be the same polydiene polyol-based TPU of the at least one cap layer.

In another aspect, the core layer comprises alternating polyester polyol-based TPU and ethylene-vinyl alcohol copolymer microlayers. Additionally, the membrane comprises one or more structural layers and at least one TPU cap layer bonded to the structural layer or layers. At least the cap layer comprises a polydiene polyol-based TPU. The polydiene polyol-based TPU can be made from a polybutadiene polyol, a polyisoprene polyol, or a partially or fully hydrogenated derivative thereof. In some aspects, the cap layer is made from an unsaturated polydiene polyol. In some aspects, the membrane further comprises a rubber layer bonded to the cap layer. Suitable materials for such a rubber layer have already been described.

In some aspects, the polydiene polyol-based TPU is made from a partially or fully hydrogenated material derived from a natural oil, including soybean oil.

II. Membrane Manufacture and Properties

In another aspect, the disclosure relates to inflated structures such as gas-filled bladders, cushioning devices, impact arrestors, and substantially closed containers made using the membranes described herein. In general, the inflated structures have good moisture resistance and very low gas transmission rates. The inflated structure can have a gas transmission rate for nitrogen gas of less than about 10 $cm^3/m^2 \cdot atm \cdot day$, or of less than about 5 $cm^3/m^2 \cdot atm \cdot day$, or of less than about 1 $cm^3/m^2 \cdot atm \cdot day$; e.g., from about 0.001 $cm^3/m^2 \cdot atm \cdot day$ to about 1 $cm^3/m^2 \cdot atm \cdot day$, about 0.01 $cm^3/m^2 \cdot atm \cdot day$ to about 1 $cm^3/m^2 \cdot atm \cdot day$ or about 0.1 $cm^3/m^2 \cdot atm \cdot day$ to about 1 $cm^3/m^2 \cdot atm \cdot day$. The inflated structures can have a moisture content within the range of 1 to 50 ppm when equilibrated for 24 h at 30° C. with a relative humidity of 50%; or the structures can have a moisture content within the range of 1 to 25 ppm when equilibrated for 24 h at 30° C. with a relative humidity of 50%; or the structures can have a moisture content within the range of 1 to 10 ppm when equilibrated for 24 h at 30° C. with a relative humidity of 50%.

The membranes of the present disclosure can be formed by various processing techniques including, for example, extrusion, blow molding, injection molding, vacuum molding, rotary molding, transfer molding, pressure forming, heat sealing, casting, low-pressure casting, spin casting, reaction injection molding, radio frequency (RF) welding, and the like. Multilayer structures are conveniently made by co-extrusion followed by heat sealing or welding to give a highly flexible, inflatable membrane. The membranes are formed into sheets, bladders, substantially closed containers, cushioning devices, accumulators, impact arrestors, and similar structures. In this context, a "substantially closed" container is one that has a low or very low gas transmission rate. Such containers may be designed with a one-way valve or similar construction that allows a fluid (gas or liquid) to enter the container easily but is effective in preventing the fluid from escaping the container. Bladders may be permanently inflated or they may be substantially closed and take advantage of "diffusion pumping" using the one-way valve concept. Techniques for generating and processing multi-layer structures have been described elsewhere (see, e.g., U.S. Pat. Nos. 5,713,141; 6,582,786; 6,652,940; 7,851,036, the teachings of which are incorporated herein by reference).

The membranes have tensile properties that reflect good strength and resilience. In particular, the membranes can have at least one of the following characteristics: (1) a tensile strength of at least about 2000 psi, or of at least about 3000 psi; (2) a 100% tensile modulus within the range of 350 to 3000 psi; (3) an elongation of at least 200%, or of 200% to 700%.

III. Detailed Description of the Drawings

FIGS. 1-5 show an athletic shoe including a sole structure and a cushioning device fabricated from a membrane of the disclosure. The shoe 10 includes a shoe upper 12 to which the sole 14 is attached. The shoe upper 12 can be formed from a variety of conventional materials including, e.g., leathers, vinyls, nylons and other generally woven fibrous materials. Typically, the shoe upper 12 includes reinforcements located around the toe 16, the lacing eyelets 18, the top of the shoe 20 and along the heel area 22. As with most athletic shoes, the sole 14 extends generally the entire length of the shoe 10 from the toe region 16 through the arch region 24 and back to the heel portion 22.

The sole 14 includes one or more membranes 28 disposed in the mid-sole 26 of the sole structure. The membranes 28 can be formed having various geometries such as a plurality of tubular members positioned in a spaced apart, parallel relationship to each other within the heel region 22 of the mid-sole 26. The tubular members 28 are sealed inflatable membranes containing an injected captive gas. More specifically, each of the membranes 28 is formed to include a TPU cap layer and a core layer comprising alternating TPU and barrier layers. The core layer resists or prevents diffusion of the captive gases. The cap layer, and optionally the core layer, comprise a polydiene polyol-based TPU.

FIGS. 4 and 5 illustrate one membrane configuration within the disclosure. Membrane 28 can have an A-B composite structure including a cap layer 32 formed of a flexible resilient elastomeric material such as a TPU that can resist expansion beyond a predetermined maximum volume for the membrane when subjected to gaseous pressure. Membrane 28 also includes a core layer 30, which is a composite comprising alternating TPU and barrier microlayers. The cap layer of membrane 28, and optionally the core layer, comprise a polydiene polyol-based TPU.

FIGS. 6 and 7 illustrate another membrane configuration within the disclosure. Membrane 28A can have an A-B-A composite structure that includes two cap layers, inner cap layer 34 and outer cap layer 32, formed of a flexible resilient elastomeric material such as a TPU that can resist expansion beyond a predetermined maximum volume for the membrane when subjected to gaseous pressure. Membrane 28A also includes a core layer 30, which is a composite comprising alternating TPU and barrier microlayers. At least one of the cap layers of membrane 28A, and optionally the core layer, comprise a polydiene polyol-based TPU.

In one aspect, cushioning devices are fabricated from multi-layered extruded tubes. Lengths of the coextruded tubing ranging from one foot to coils of up to 5 feet, are inflated to a desired initial inflation pressure ranging from 0 psi ambient to 100 psi, or in the range of 5 to 50 psi, with the captive gas being an inert gas such as, for example, nitrogen. Sections of the tubing are RF welded or heat sealed to the desired lengths. The individual cushioning devices produced are then separated by cutting through the welded areas between adjacent cushioning devices. FIGS. 1-7 illustrate cushioning devices that can be fabricated using such a co-extrusion technique. Cushioning devices can also be fabricated with so-called "lay flat" extruded tubing whereby the internal geometry is welded into the tube.

Figure 8:
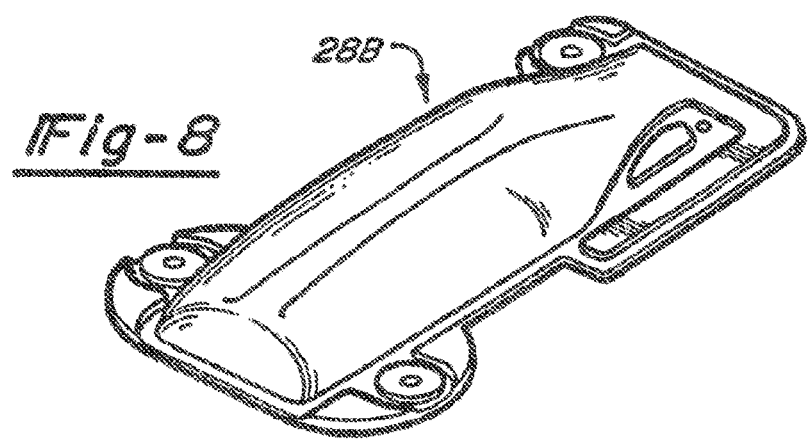
Figure 9:
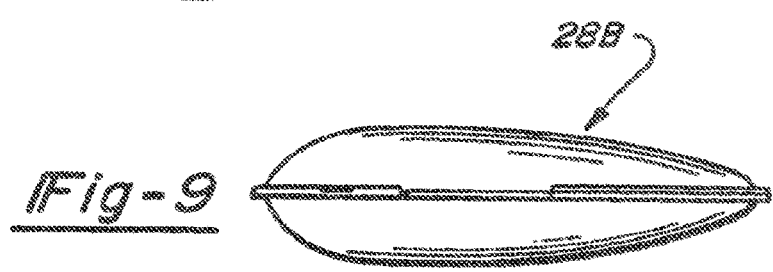
Figure 10:
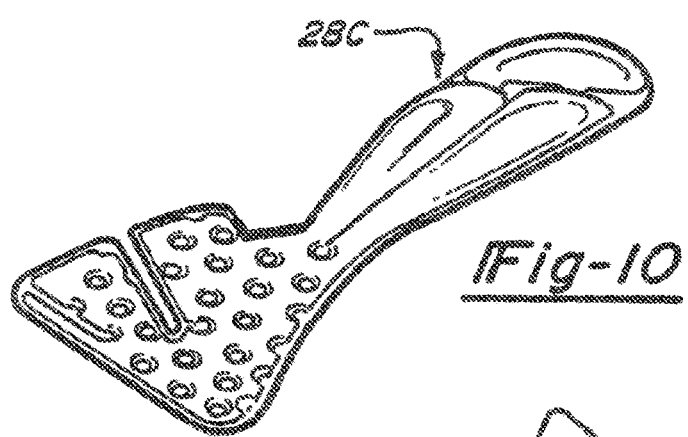
Figure 11:
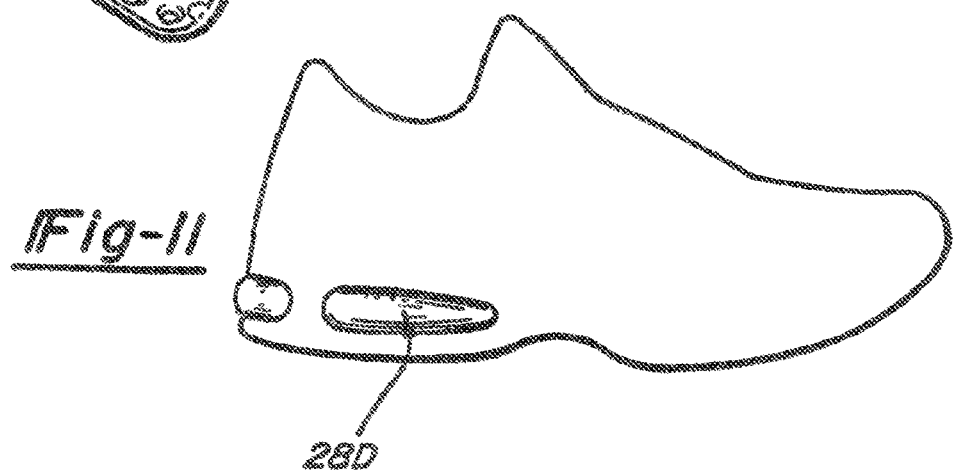

Cushioning devices can also be made using blow molding. In one suitable blow molding approach, sheets or films of coextruded multilayer films are first formed. Two sheets of the multi-layer film are placed on top of each other and welded together along selected points using conventional heat sealing techniques or RF welding techniques. The uninflated bladder is then inflated through a formed inflation port to the desired initial inflation pressure. FIGS. 8-10 illustrate cushioning devices made using this approach.

Figure 12:
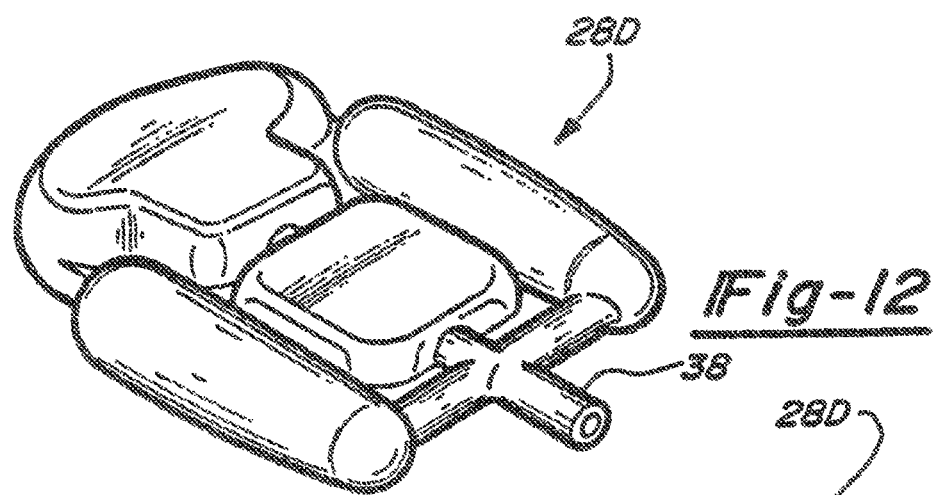
Figure 13:
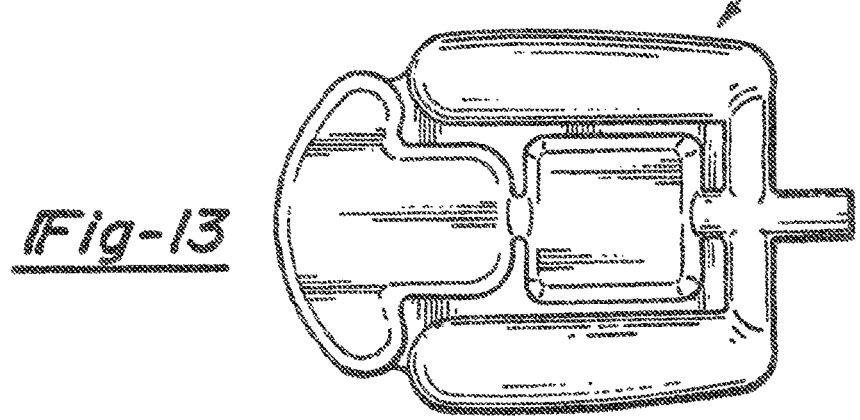
Figure 14:
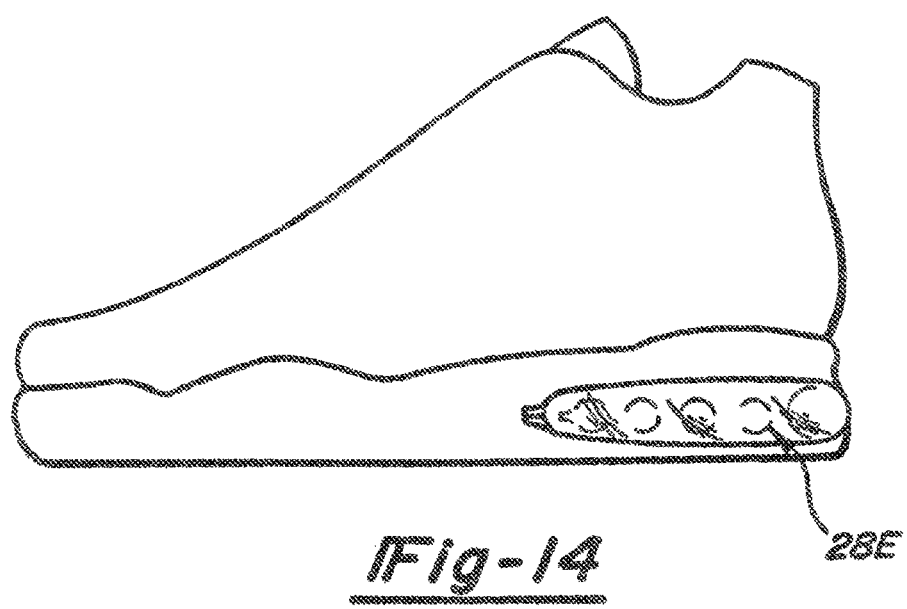
Figure 15:
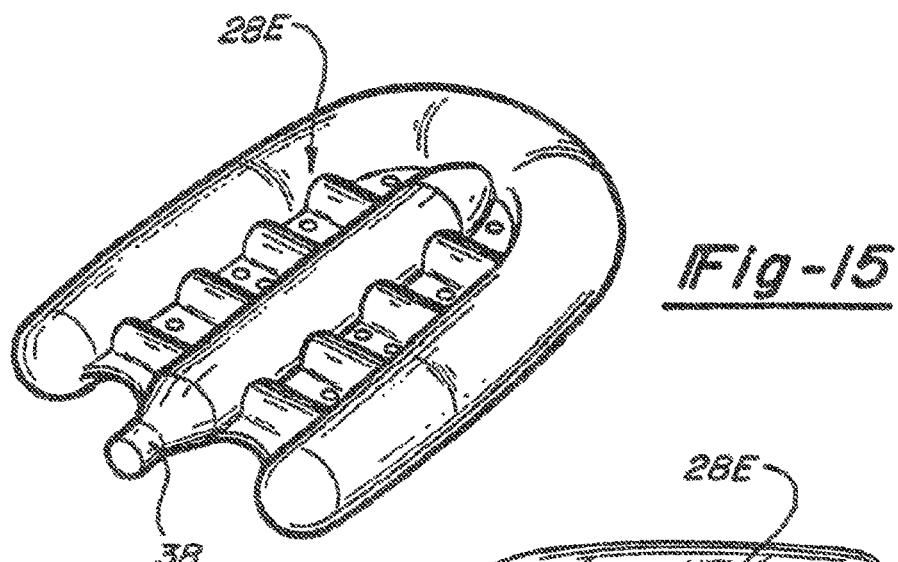
Figure 16:
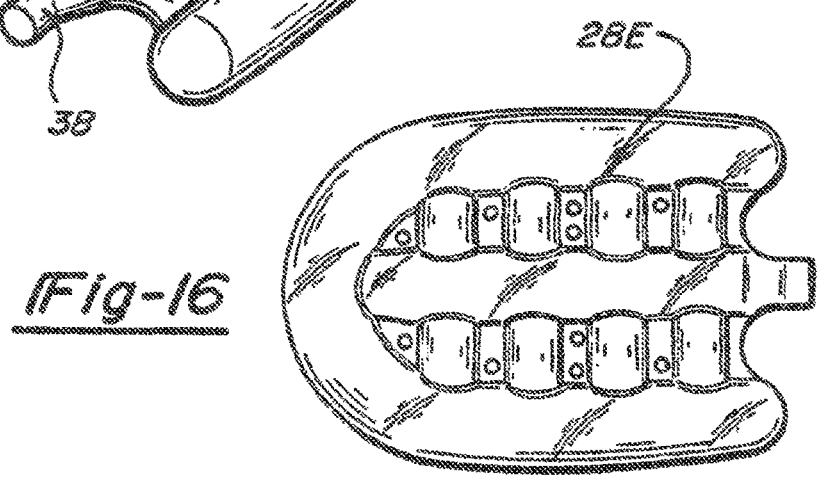

In another suitable blow molding approach, air bladders are formed by co-extruding parisons comprising two or more film layers. The parisons are blown and formed using conventional blow molding techniques. The resulting bladders, which are illustrated by FIGS. 12 and 15, are then inflated with the desired captive gas to the desired initial inflation pressure. The bladders may include an inflation port that can be sealed by RF welding or other suitable techniques.

Figure 17:
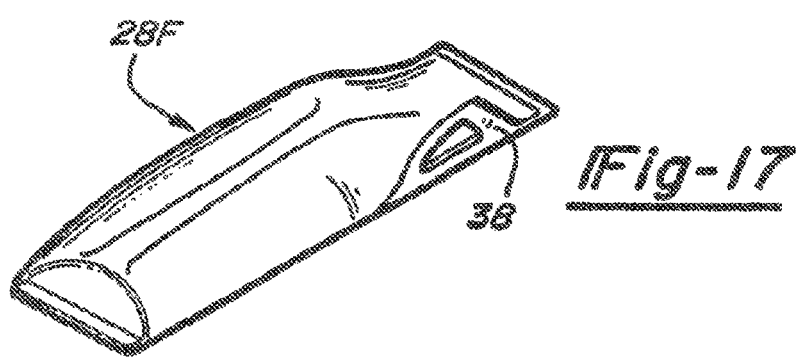
Figure 18:

In yet another approach, the cushioning device is fabricated by forming co-extruded multilayer tubing that is collapsed to a lay flat configuration. The opposite walls are welded together at selected points and at each end using conventional heat sealing techniques or RF welding. The device is then inflated through a formed inflation port to the desired inflation pressure. FIGS. 17 and 18 illustrate cushioning devices made using this approach.

The cushioning devices described above and shown in FIGS. 1-18 are designed to be used as midsoles for articles of footwear, and particularly in athletic shoes. In such applications, the devices may be used in any one of several different embodiments including: (1) completely encapsulated in a suitable midsole foam; (2) encapsulated only on the top portion of the unit to fill-in and smooth-out the uneven surfaces for added comfort under the foot; (3) encapsulated on the bottom portion to assist attachment of the out-sole; (4) encapsulated on the top and bottom portions but exposing the perimeter sides for cosmetic and marketing reasons; (5) encapsulated on the top and bottom portions but exposing only selected portions of the sides of the unit; (6) encapsulated on the top portion by a molded "footbed"; and (7) used with no encapsulation foam whatsoever.

Figure 19:
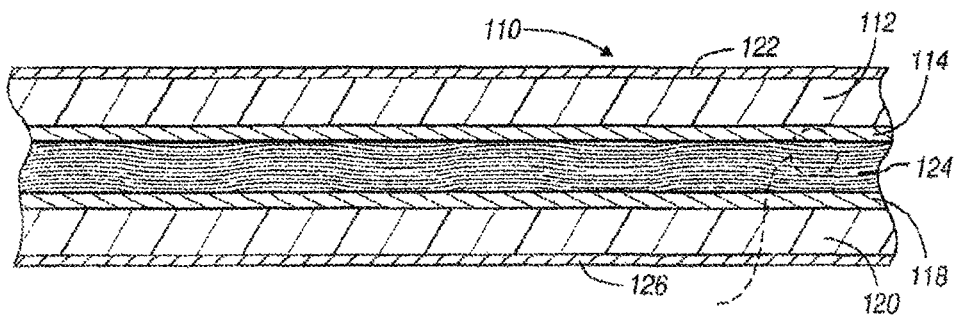
Figure 20:
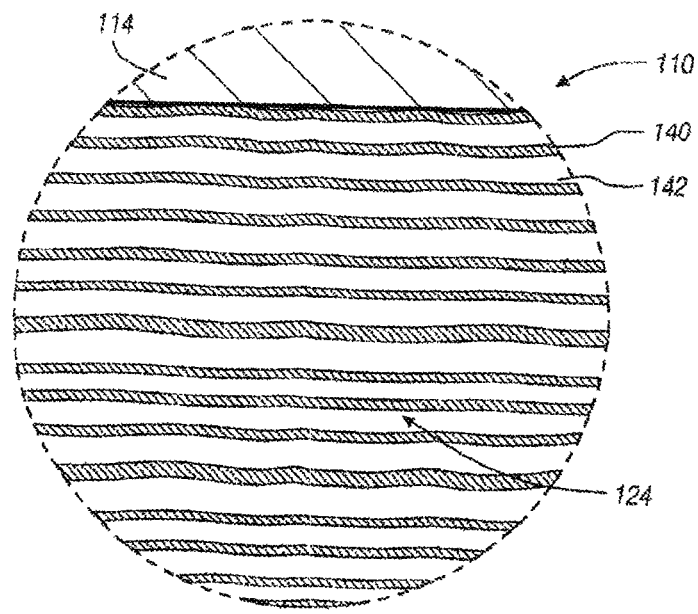

FIGS. 19 and 20 illustrate another membrane configuration within the disclosure. As shown in FIG. 19, membrane 110 has a core layer 124 which comprises a composite of alternating TPU and barrier microlayers. Layers 114 and 118 are tie layers comprising a TPU elastomer. Layers 112 and 120 are structural TPU layers. Membrane 110 also has TPU cap layers 122 and 126, shown as thin layers here, though they need not be thin. At least one of TPU cap layers 122 and 126 in membrane 110 is a polydiene polyol-based TPU.

FIG. 20 shows an expanded view of a section of the multilayer membrane 110 of FIG. 19. A portion of tie layer 114 borders a portion of core layer 124. Discrete, alternating TPU elastomer microlayers 142 and barrier microlayers 140 are shown. The barrier microlayers can be formed from an ethylene-vinyl alcohol copolymer.

IV. Articles of Manufacture

In another aspect, the disclosure relates to articles of manufacture made from the membranes or inflated structures described above. In particular, the articles of manufacture may include shoes (dress shoes, athletic footwear, hiking boots, work boots, or the like), skates (hockey skates, figure skates, in-line skates, roller skates, or the like), balls (soccer balls, footballs, basketballs, kickballs, etc.), tires (vehicle tires, bicycle tires, inner tubes, or the like), bicycle seats, saddles, personal protective articles (e.g., helmets, shin guards, hockey gloves, chest protectors), flexible flotation devices (life jackets), rigid flotation devices (e.g., boat hulls), medical devices (e.g., catheter balloons), prosthetic devices, orthopedic devices, accumulators, or article of furniture made from the membranes or from the bladders, cushioning devices, or substantially closed containers.

V. Methods for Producing Membranes

In another aspect, the disclosure relates to a method for producing a membranes (e.g., durable membranes). The method comprises at least two steps. In a first step, alternating barrier and TPU microlayers are co-extruded to form a core layer comprising a composite of the microlayers. In an optional second step, at least one TPU structural layer is applied to the core layer to give a combination core-and-structural layer. In a third step (not optional), at least one TPU cap layer is co-extruded with either the core layer or the combination core-and-structural layer to form the membrane. As an alternative third step, at least one TPU cap layer is laminated onto either the core layer or the combination core-and-structural layer to form the membrane. In the method of the present disclosure, the at least one cap layer comprises a polydiene polyol-based TPU.

In some aspects, the method for producing membranes may further comprise at least one of: (a) using a tie layer to bond the core layer to the at least one cap layer; (b) using a tie layer to bond the core layer to the optional at least one structural layer, when present; and (c) using a tie layer to bond the optional combination core-and-structural layer, when present, to the at least one cap layer. At least one cap layer for this method comprises a polydiene polyol-based TPU, including a TPU made from an unsaturated polydiene polyol.

In another method, the at least one TPU cap layer comprises two TPU cap layers, at least one of which comprises the polydiene polyol-based TPU.

In another method, the polydiene polyol-based TPU is made from an unsaturated polydiene polyol.

In another method, the unsaturated polydiene polyol has a hydroxyl number within the range of 11 to 560 mg KOH/g.

In another aspect, the method of the present disclosure further comprises the step of bonding a rubber layer to the at least one TPU cap layer. In one such method, the rubber layer consists essentially of a silicone-free rubber. In another method, the rubber layer is a sulfur-cured or peroxide-cured rubber layer. In another method, the rubber layer is selected from the group consisting of natural rubber, butyl rubber, neoprene rubber, nitrile rubber, isoprene rubber, butadiene rubber, styrene-butadiene rubber, ethylene propylene diene monomer (EPDM) rubber, ethylene-propylene rubber, urethane rubber, and any combination thereof. In another method, the at least one TPU cap layer is made from a polybutadiene polyol, a polyisoprene polyol, or a combination of both, and the rubber layer is bonded to the at least one TPU cap layer using a sulfur-based curing agent or a peroxide curing agent. In another method, the rubber layer comprises an acrylate rubber, and the rubber layer is bonded to the at least one TPU cap layer using a peroxide curing agent. In another method, the polydiene polyol-based TPU is made from an unsaturated polydiene polyol.

In another method, the optional at least one structural layer, when present, comprises reground membrane material.

In another method, the polydiene polyol-based TPU is made from a polybutadiene polyol, a polyisoprene polyol, or a partially or fully hydrogenated derivative of a polybutadiene polyol or of a polyisoprene polyol.

In another method, the polydiene polyol-based TPU is made from a partially or fully hydrogenated material derived from soybean oil.

In another method, the core layer comprises TPU microlayers made from a polyester polyol, a polyether polyol, a polycarbonate polyol, a polycaprolactone polyether, or any combination thereof.

In another method, the core layer comprises TPU microlayers made from a polydiene polyol-based TPU.

In another method, the optional at least one structural layer, when present, comprises a TPU made from a polyester polyol, a polyether polyol, a polycarbonate polyol, a polycaprolactone polyether, or any combination thereof.

In another method, the optional at least one structural layer, when present, comprises a TPU made from a polydiene polyol-based TPU.

In another method, the core layer comprises barrier microlayers of an ethylene-vinyl alcohol copolymer.

In another method, the core layer comprises alternating polyester polyol-based TPU and ethylene-vinyl alcohol copolymer microlayers, and the optional at least one structural layer, when present, comprises a polydiene polyol-based TPU.

In another method, the polydiene polyol-based TPU of the optional at least one structural layer, when present, is the same polydiene polyol-based TPU of the at least one cap layer.

In another aspect, the method further comprises inflating and sealing the membrane to form a gas-filled bladder, cushioning device, impact arrestor, or substantially closed container.

In some aspects, the method further comprises incorporating the membrane into a shoe, skate, ball, tire, bicycle seat, saddle, personal protective article, flexible flotation device, rigid flotation device, medical device, prosthetic device, orthopedic device, accumulator, or article of furniture.

In other aspects, the method further comprises inflating and sealing the membrane to form a gas-filled bladder, cushioning device, impact arrestor, or substantially closed container. In some methods, the gas-filled bladder, cushioning device, impact arrestor, or substantially closed container has a gas transmission rate for nitrogen gas of less than about 10 cm³/m²·atm·day, or of less than about 1 cm³/m²·atm·day, e.g., from about 0.001 cm³/m²·atm·day to about 1 cm³/m²·atm·day, about 0.01 cm³/m²·atm·day to about 1 cm³/m²·atm·day or about 0.1 cm³/m²·atm·day to about 1 cm³/m²·atm·day. In other methods, the gas-filled bladder, cushioning device, impact arrestor, or substantially closed container has a moisture content within the range of 1 to 50 ppm, or 1 to 10 ppm, when equilibrated for 24 h at 30° C. with a relative humidity of 50%.

In some aspects, the method further comprises incorporating the gas-filled bladder, cushioning device, impact arrestor, or substantially closed container into a shoe, skate, ball, tire, bicycle seat, saddle, personal protective article, flexible flotation device, rigid flotation device, medical device, prosthetic device, orthopedic device, accumulator, or article of furniture.

The present invention provides for the following clauses, the numbering of which is not to be construed as designating levels of importance:

Clause 1: A membrane comprising:
(a) a core layer comprising a composite of alternating thermoplastic polyurethane (TPU) and barrier microlayers;
(b) optionally, at least one TPU structural layer bonded to the core layer;
(c) at least one cap layer bonded to the core layer or structural layer; and
(d) optionally, at least one tie layer between the core layer and the cap layer, or between the core layer and the optional structural layer when present, or between the optional structural layer when present and the cap layer, or any combination thereof;
wherein at least one of the cap layer, and optionally the core layer, the optional structural layer when present, or both the core layer and the structural layer, comprise a polydiene polyol-based TPU.

Clause 2: The membrane of Clause 1 wherein the cap layer is a TPU cap layer.

Clause 3: The membrane of Clause 2 wherein the at least one TPU cap layer comprises two TPU cap layers, at least one of which comprises the polydiene polyol-based TPU.

Clause 4: The membrane of Clause 1 wherein the cap layer is a reactive cap layer.

Clause 5: The membrane of Clause 1 or 4 wherein the membrane has a gas transmission rate for nitrogen gas of from about 0.001 cm³/m²·atm·day to about 1 cm³/m²·atm·day.

Clause 6: The membrane of Clause 1 wherein the polydiene polyol-based TPU is made from an unsaturated polydiene polyol.

Clause 7: The membrane of Clause 6 wherein the unsaturated polydiene polyol has a hydroxyl number within the range of 11 to 560 mg KOH/g.

Clause 8: The membrane of any of Clauses 1 to 7 further comprising a rubber layer bonded to the at least one TPU cap layer.

Clause 9: The membrane of Clause 8 wherein the rubber layer consists essentially of a silicone-free rubber.

Clause 10: The membrane of Clause 8 or 9 wherein the rubber layer is a sulfur-cured or peroxide-cured rubber layer.

Clause 11: The membrane of any of Clauses 8 to 9 wherein the rubber layer is selected from the group consisting of natural rubber, butyl rubber, neoprene rubber, nitrile rubber, isoprene rubber, butadiene rubber, styrene-butadiene rubber, ethylene propylene diene monomer (EPDM) rubber, ethylene-propylene rubber, urethane rubber, and any combination thereof.

Clause 12: The membrane of any of Clauses 8 to 11 wherein the at least one TPU cap layer is made from a polybutadiene polyol, a polyisoprene polyol, or a combination of both, and wherein the rubber layer is bonded to the at least one TPU cap layer using a sulfur-based curing agent or a peroxide curing agent.

Clause 13: The membrane of any of Clauses 8 to 11 wherein the rubber layer comprises an acrylate rubber, and wherein the rubber layer is bonded to the at least one TPU cap layer using a peroxide curing agent.

Clause 14: The membrane of any of Clauses 1 to 13 wherein the optional at least one structural layer, when present, comprises reground membrane material.

Clause 15: The membrane of any of Clauses 1 to 14 wherein the polydiene polyol-based TPU is made from a polybutadiene polyol, a polyisoprene polyol, or a partially or fully hydrogenated derivative of a polybutadiene polyol or of a polyisoprene polyol.

Clause 16: The membrane of any of Clauses 1 to 15 wherein the polydiene polyol-based TPU is made from a partially or fully hydrogenated material derived from soybean oil.

Clause 17: The membrane of any of Clauses 1 to 16 wherein the core layer comprises TPU microlayers made from a polyester polyol, a polyether polyol, a polycarbonate polyol, a polycaprolactone polyether, or any combination thereof.

Clause 18: The membrane of any of Clauses 1 to 16 wherein the core layer comprises TPU microlayers made from a polydiene polyol-based TPU.

Clause 19: The membrane of any of Clauses 1 to 18 wherein the optional at least one structural layer, when present, comprises a TPU made from a polyester polyol, a polyether polyol, a polycarbonate polyol, a polycaprolactone polyether, or any combination thereof.

Clause 20: The membrane of any of Clauses 1 to 19 wherein the optional at least one structural layer, when present, comprises a TPU made from a polydiene polyol-based TPU.

Clause 21: The membrane of any of Clauses 1 to 20 wherein the core layer comprises barrier microlayers of an ethylene-vinyl alcohol copolymer.

Clause 22: The membrane of any of Clauses 1 to 21 wherein the core layer comprises alternating polyester polyol-based TPU and ethylene-vinyl alcohol copolymer microlayers, and wherein the optional at least one structural layer, when present, comprises a polydiene polyol-based TPU.

Clause 23: The membrane of Clause 22 wherein the polydiene polyol-based TPU of the optional at least one structural layer, when present, is the same polydiene polyol-based TPU of the at least one cap layer.

Clause 24: A shoe, skate, ball, tire, bicycle seat, saddle, personal protective article, flexible flotation device, rigid flotation device, medical device, prosthetic device, orthopedic device, accumulator, or article of furniture made from the membrane of any of Clauses 1 to 23.

Clause 25: A gas-filled bladder, cushioning device, impact arrestor, or substantially closed container made from the membrane of any of Clauses 1 to 23.

Clause 26: The gas-filled bladder, cushioning device, impact arrestor, or substantially closed container of Clause 25 having a gas transmission rate for nitrogen gas of less than about 10 cm³/m²·atm·day.

Clause 27: The gas-filled bladder, cushioning device, impact arrestor, or substantially closed container of Clause 25 having a gas transmission rate for nitrogen gas of less than about 1 cm$^3$/m$^2$·atm·day.

Clause 28: The gas-filled bladder, cushioning device, impact arrestor, or substantially closed container of any of Clauses 25 to 27 having a moisture content within the range of 1 to 50 ppm when equilibrated for 24 h at 30° C. with a relative humidity of 50%.

Clause 29: The gas-filled bladder, cushioning device, impact arrestor, or substantially closed container of any of Clauses 25 to 28 having a moisture content within the range of 1 to 10 ppm when equilibrated for 24 h at 30° C. with a relative humidity of 50%.

Clause 30: The gas-filled bladder, cushioning device, impact arrestor, or substantially closed container having a gas transmission rate for nitrogen gas of from about 0.001 cm$^3$/m$^2$·atm·day to about 1 cm$^3$/m$^2$·atm·day.

Clause 31: A shoe, skate, ball, tire, bicycle seat, saddle, personal protective article, flexible flotation device, rigid flotation device, medical device, prosthetic device, orthopedic device, accumulator, or article of furniture comprising the bladder, cushioning device, impact arrestor, or substantially closed container of any of Clauses 25 to 30.

Clause 32: A method for producing a membrane, comprising:
(a) co-extruding alternating barrier and TPU microlayers to form a core layer comprising a composite of the microlayers;
(b) optionally, applying at least one TPU structural layer to the core layer to give a combination core-and-structural layer; and
(c1) co-extruding at least one cap layer with either the core layer or the combination core-and-structural layer to form the membrane; or
(c2) laminating at least one cap layer onto either the core layer or the combination core-and-structural layer to form the membrane.

Clause 33: The method of Clause 32, wherein the at least one cap layer comprises a polydiene polyol-based TPU.

Clause 34: The method of any of Clause 33 wherein the polydiene polyol-based TPU is made from a polybutadiene polyol, a polyisoprene polyol, or a partially or fully hydrogenated derivative of a polybutadiene polyol or of a polyisoprene polyol.

Clause 35: The method of Clause 33 wherein the polydiene polyol-based TPU is made from a partially or fully hydrogenated material derived from soybean oil.

Clause 36: The method of Clause 33 wherein the polydiene polyol-based TPU is made from an unsaturated polydiene polyol.

Clause 37: The method of Clause 32 further comprising at least one of: (a) using a tie layer to bond the core layer to the at least one cap layer; (b) using a tie layer to bond the core layer to the optional at least one structural layer, when present; and (c) using a tie layer to bond the optional combination core-and-structural layer, when present, to the at least one cap layer.

Clause 38: The method of Clause 33 wherein the at least one TPU cap layer comprises two TPU cap layers, at least one of which comprises the polydiene polyol-based TPU.

Clause 39: The method of Clause 33 wherein the polydiene polyol-based TPU is made from an unsaturated polydiene polyol.

Clause 40: The method of Clause 36 wherein the unsaturated polydiene polyol has a hydroxyl number within the range of 11 to 560 mg KOH/g.

Clause 41 The method of Clause 32 further comprising the step of bonding a rubber layer to the at least one cap layer.

Clause 42: The method of Clause 41 wherein the rubber layer consists essentially of a silicone-free rubber.

Clause 43: The method of Clause 41 or 42 wherein the rubber layer is a sulfur-cured or peroxide-cured rubber layer.

Clause 44 The method of any of Clauses 41 to 43 wherein the rubber layer is selected from the group consisting of natural rubber, butyl rubber, neoprene rubber, nitrile rubber, isoprene rubber, butadiene rubber, styrene-butadiene rubber, ethylene propylene diene monomer (EPDM) rubber, ethylene-propylene rubber, urethane rubber, and any combination thereof.

Clause 45: The method of any of Clauses 41 to 44 wherein the at least one cap layer is a TPU cap layer made from a polybutadiene polyol or a polyisoprene polyol, or a combination of both, and wherein the rubber layer is bonded to the at least one TPU cap layer using a sulfur-based curing agent or a peroxide curing agent.

Clause 46: The method of any of Clauses 41 to 45 wherein the rubber layer comprises an acrylate rubber, and wherein the rubber layer is bonded to the at least one TPU cap layer using a peroxide curing agent.

Clause 47: The method of any of Clauses 32 to 46 wherein the optional at least one structural layer, when present, comprises reground membrane material.

Clause 48: The method of any of Clauses 32 to 47 wherein the core layer comprises TPU microlayers made from a polyester polyol, a polyether polyol, a polycarbonate polyol, a polycaprolactone polyether, or any combination thereof.

Clause 49: The method of any of Clauses 32 to 47 wherein the core layer comprises TPU microlayers made from a polydiene polyol-based TPU.

Clause 50: The method of any of Clauses 32 to 49 wherein the optional at least one structural layer, when present, comprises a TPU made from a polyester polyol, a polyether polyol, a polycarbonate polyol, a polycaprolactone polyether, or any combination thereof.

Clause 51: The method of any of Clauses 32 to 50 wherein the optional at least one structural layer, when present, comprises a TPU made from a polydiene polyol-based TPU.

Clause 52: The method of any of Clauses 32 to 51 wherein the core layer comprises barrier microlayers of an ethylene-vinyl alcohol copolymer.

Clause 53: The method of any of Clauses 32 to 52 wherein the core layer comprises alternating polyester polyol-based TPU and ethylene-vinyl alcohol copolymer microlayers, and wherein the optional at least one structural layer, when present, comprises a polydiene polyol-based TPU.

Clause 54: The method of Clause 53 wherein the polydiene polyol-based TPU of the optional at least one structural layer, when present, is the same polydiene polyol-based TPU of the at least one cap layer.

Clause 55: The method of any of Clauses 32 to 54 further comprising incorporating the membrane into a shoe, skate, ball, tire, bicycle seat, saddle, personal protective article, flexible flotation device, rigid flotation device, medical device, prosthetic device, orthopedic device, accumulator, or article of furniture.

Clause 56: The method of any of Clauses 32 to 55 further comprising inflating and sealing the membrane to form a gas-filled bladder, cushioning device, impact arrestor, or substantially closed container.

Clause 57: The method of Clause 56 wherein the gas-filled bladder, cushioning device, impact arrestor, or substantially closed container has a gas transmission rate for nitrogen gas of less than about 10 cm$^3$/m$^2$·atm·day.

Clause 58: The method of Clause 56 or 57 wherein the gas-filled bladder, cushioning device, impact arrestor, or substantially closed container has a gas transmission rate for nitrogen gas of less than about 1 cm$^3$/m$^2$·atm·day.

Clause 59: The method of any of Clauses 56 to 58 wherein the gas-filled bladder, cushioning device, impact arrestor, or substantially closed container has a moisture content within the range of 1 to 50 ppm when equilibrated for 24 h at 30° C. with a relative humidity of 50%.

Clause 60: The method of any of Clauses 56 to 59 wherein the gas-filled bladder, cushioning device, impact arrestor, or substantially closed container has a moisture content within the range of 1 to 10 ppm when equilibrated for 24 h at 30° C. with a relative humidity of 50%.

Clause 61: The method of any of Clauses 56 to 60 further comprising incorporating the gas-filled bladder, cushioning device, impact arrestor, or substantially closed container into a shoe, skate, ball, tire, bicycle seat, saddle, personal protective article, flexible flotation device, rigid flotation device, medical device, prosthetic device, orthopedic device, accumulator, or article of furniture.

Clause 62: The preceding discussion is merely illustrative; the following claims define the scope of the inventive subject matter.

What is claimed is:

1. A membrane comprising:
   (a) a core layer comprising a composite of alternating thermoplastic polyurethane (TPU) microlayers and barrier microlayers; and
   (b) at least one cap layer bonded to the core layer;
   wherein the at least one cap layer comprises a first polydiene polyol-based TPU and a cure package.

2. The membrane of claim 1, wherein the membrane has a gas transmission rate for nitrogen gas of from about 0.001 cm$^3$/m$^2$·atm·day to about 1 cm$^3$/m$^2$·atm·day.

3. The membrane of claim 1, further comprising a rubber layer bonded to the at least one cap layer.

4. The membrane of claim 1, wherein barrier microlayers of the core layer comprise an ethylene-vinyl alcohol copolymer.

5. A tire made from the membrane of claim 1.

6. A gas-filled bladder made from the membrane of claim 1.

7. The gas-filled bladder of claim 6 having a gas transmission rate for nitrogen gas of less than 10 cm$^3$/m$^2$·atm·day.

8. The gas-filled bladder of claim 6 having a gas transmission rate for nitrogen gas of less than 1 cm$^3$/m$^2$·atm·day.

9. A tire including the gas-filled bladder of claim 6.

10. The tire of claim 5, wherein the tire has a gas transmission rate for nitrogen gas of less than 10 cm$^3$/m$^2$·atm·day".

11. The tire of claim 5, wherein the tire has a gas transmission rate for nitrogen gas of less than 1 cm$^3$/m$^2$·atm·day.

12. The membrane of claim 1, wherein the cure package comprises molecular sulfur or peroxide curing agents.

13. The membrane of claim 3, wherein the rubber layer comprises a natural rubber, a butyl rubber, a neoprene rubber, a nitrile rubber, an isoprene rubber, a butadiene rubber, a styrene-butadiene rubber, an ethylene-propylene-diene (EPDM) rubber, an ethylene-propylene rubber, a urethane rubber, or any combination thereof.

14. The membrane of claim 13, wherein the rubber layer comprises a butyl rubber.

15. The membrane of claim 1, wherein the polydiene polyol-based TPU includes a polybutadiene polyol, a polyisoprene polyol, or both.

16. The membrane of claim 1, wherein the polydiene polyol-based TPU includes a partially or fully hydrogenated derivative of a polybutadiene polyol, a partially or fully hydrogenated derivative of a polyisoprene polyol, or any combination thereof.

17. The membrane of claim 1, wherein the polydiene polyol-based TPU includes an unsaturated polydiene polyol-based TPU.

18. The membrane of claim 1, wherein the TPU microlayers comprise elastomeric thermoplastic polyurethanes.

19. The membrane of claim 18, wherein the elastomeric thermoplastic polyurethanes include polyether polyols, polyester polyols, polycarbonate polyols, polycaprolactone polyethers, or any combination thereof.

20. The membrane of claim 18, wherein the elastomeric thermoplastic polyurethanes include polyether diols, polyester diols, or polycarbonate diols.

21. The membrane of claim 1, wherein the core layer comprises alternating polyester polyol-based TPU microlayers and ethylene-vinyl alcohol copolymer microlayers.

* * * * *